Patented Dec. 19, 1933

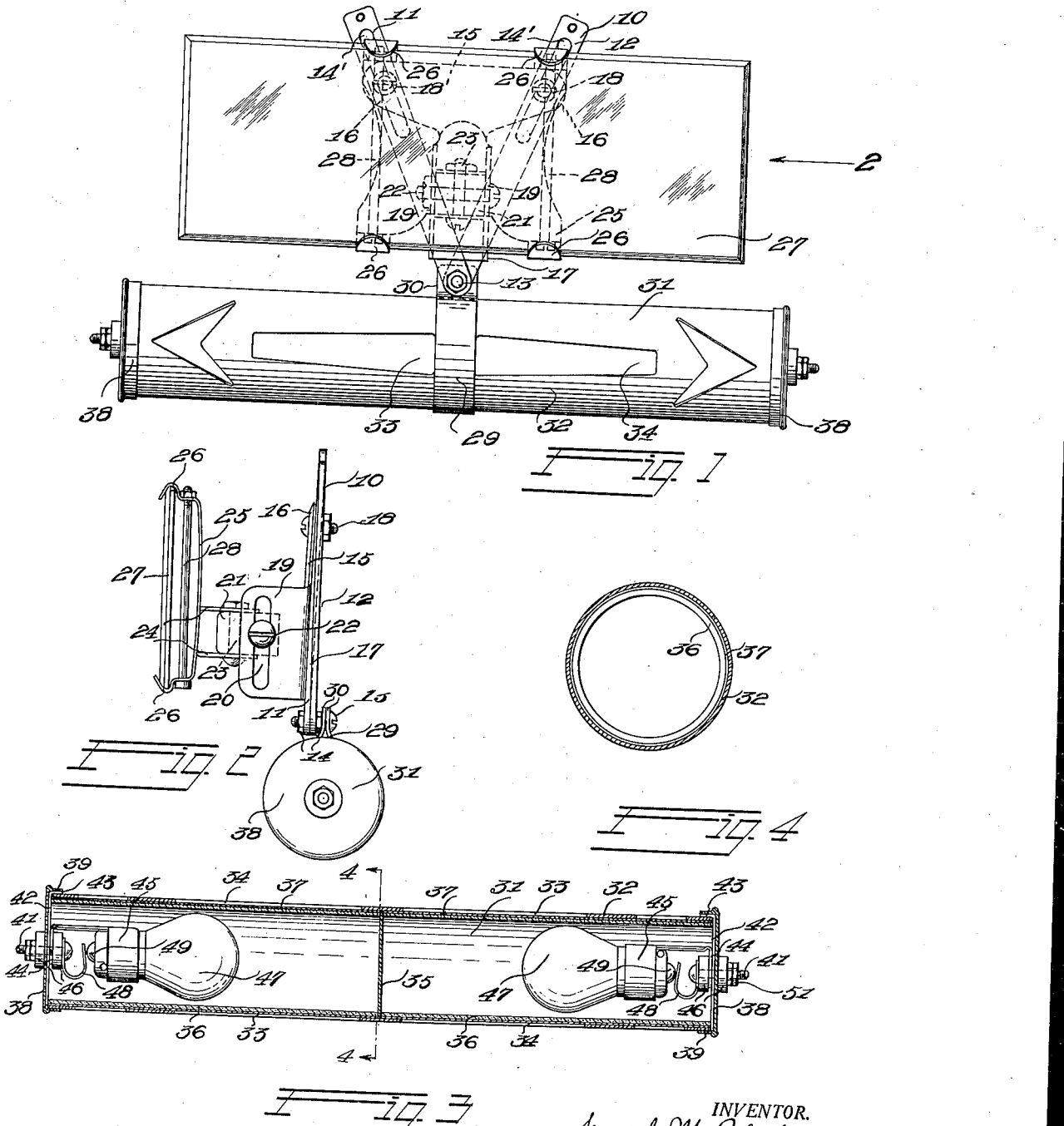

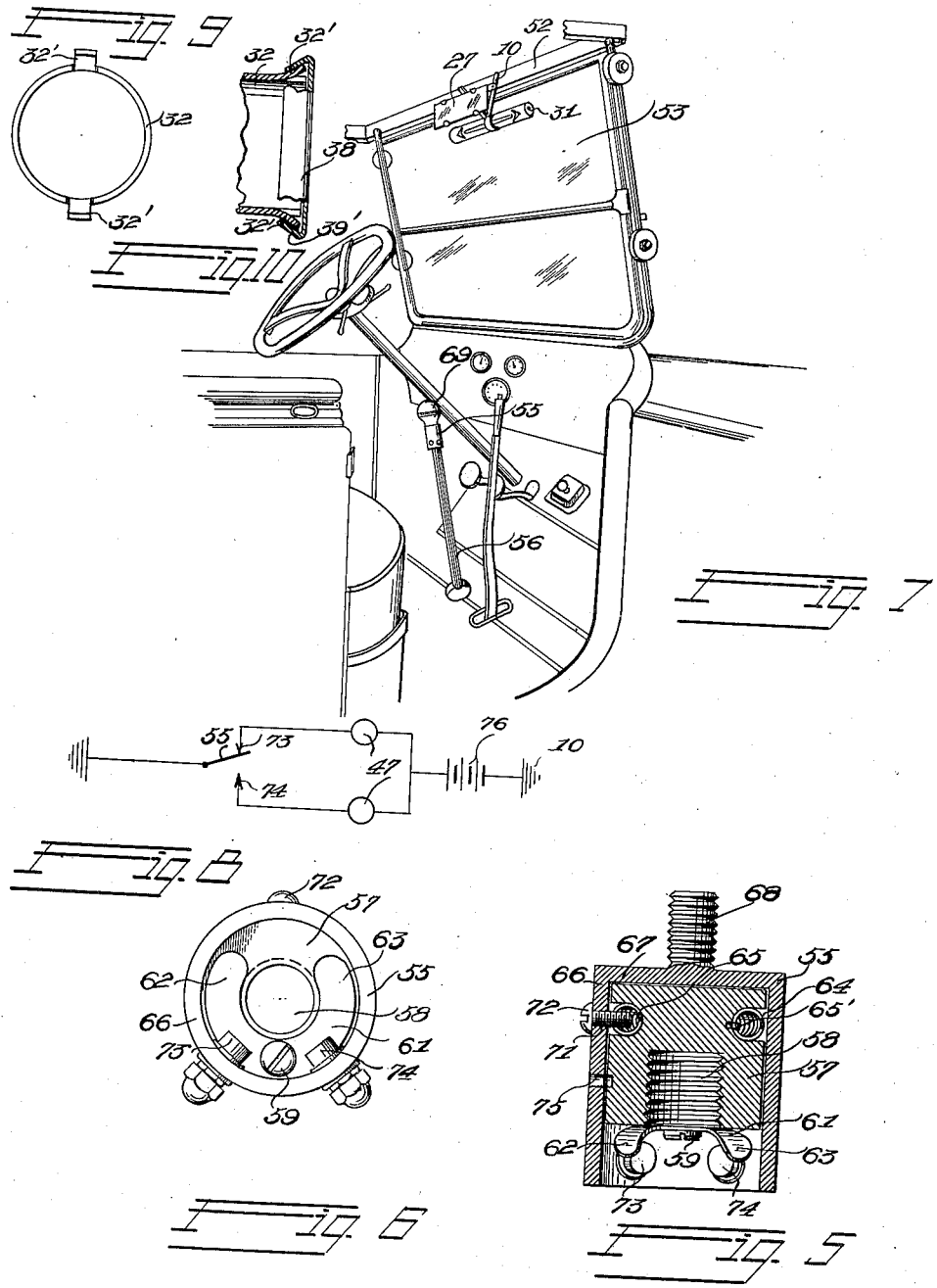

1,940,605

UNITED STATES PATENT OFFICE 1,940,605

DIRECTION SIGNALING DEVICE

Seward M. Roberts, South Orange, N. J.

Application February 28, 1928. Serial No. 257,650

8 Claims. (Cl. 177—339)

This invention relates to a direction signaling device.

More specifically the invention relates to a direction signaling device specially adapted for automobiles, to indicate the direction in which the driver intends to turn.

One of the objects of my invention is the provision of a direction signaling device for automobiles, which is of such construction and adapted to be so mounted that the direction in which the driver of the automobile intends to turn is simultaneously indicated both to the front and to the rear of the automobile.

A further object of the present invention is the provision of a direction signaling device for automobiles adapted to be mounted inside the windshield in such position that it is visible through the rear window of the automobile, whereby a desired change in direction will be indicated both to the front and to the rear of the automobile, and whereby the device itself will serve as a pilot light to keep the driver informed as to the operating condition thereof.

A still further object of the invention is the provision of a direction signaling device for automobiles comprising an indicating member, and a rotatable switch member adapted for connection with the gear shift lever for lighting one or another of the lights withins the indicating member.

A still further object of the invention is the provision of a signaling device comprising a cylindrical member having oppositely positioned indices opening therethrough, and end caps for the cylindrical member, each provided with a light adapted to rest within the cylindrical member upon application of the respective cap to the cylindrical member.

A still further object of the invention is the provision of a novel form of bracket for jointly supporting a rear view mirror and a direction signaling device.

With these objects in view, as well as others as will become apparent from the following disclosure, reference will be had to the accompanying drawings forming a part thereof, and in which:

Figure 1 is a front elevational view of a rear view mirror and a direction signaling device jointly supported by a bracket adapted for connection with the body of an automobile above the windshield.

Figure 2 is an end view thereof, looking in the direction of the arrow 2 in Figure 1.

Figure 3 is a longitudinal sectional view through the cylindrical indicating member of the signaling device.

Figure 4 is a transverse sectional view on line 4—4 of Figure 3 looking in the direction of the arrows.

Figure 5 is a central longitudinal sectional view through the switch adapted for connection with the gear shift lever.

Figure 6 is a bottom plan view of the switch.

Figure 7 is a perspective view of a portion of an automobile showing the connection of the signaling device thereto.

Figure 8 is a wiring diagram showing the necessary connections.

Figure 9 is an end view of the shell showing a modified means for holding the end caps in position, and Figure 10 is a longitudinal sectional view taken centrally and vertically through the device of Figure 9.

Referring to the drawings by reference characters in which like characters designate like parts, 10 designates a bracket which comprises a pair of bars 11 and 12 whose inner ends are overlapped and provided with aligned apertures through which extends a bolt 13 provided with nuts 14 engaging opposite faces of bars 11 and 12. The bars 11 and 12 diverge outwardly from their connected inner ends and are each provided with an elongated slot 14' adjacent the outer end thereof. Resting against and secured to the front faces of bars 11 and 12 is a plate 15 which comprises laterally projecting ears 16 and a downwardly extending tongue 17. Ears 16 are apertured for the reception of bolts 18 which extend through slots 14' and which serve for attaching bracket 10 to the top cross bar of an open car as shown in Figure 7 or to the body above the windshield in a closed car. The provision of slots 14' and pivoted connection provided by bolt 13 permits ready adjustment of bracket 10 whereby any mirror which has been in use can be supported by bracket 10 which in turn can be secured in position by the same screws or bolts formerly used in their same positions. Tongue 17 is provided with opposite forwardly projecting flanges 19 which are in turn provided with transversely aligned vertically extending slots 20.

Disposed between flanges 19 is a pivot block 21 which is transversely apertured for reception of a bolt 22 adapted to extend through slots 20 for pivotally and adjustably securing block 21 between flanges 19. Block 21 is further provided with a vertical aperture for reception of a bolt 23 which also extends through vertically spaced flanges 24 engaging opposite faces of block 21 and carried by a mirror supporting plate 25. The connection between block 21 and flanges 24 provides for a lateral pivoting movement of plate 25. Plate 25 is provided with mirror engaging lugs 26 which are adapted to support a mirror 27 and held in engagement therewith by means of bolts 28 which extend through oppositely positioned lugs 26 as is clearly shown in Figures 1 and 2.

Supported from the lower connected ends of bars 11 and 12 is a cylindrical member 29 provided with apertured ears 30 adapted to be brought into engagement to receive bolt 13 which connects the inner ends of bars 11 and 12 as is clearly shown in Figure 2. The clip member is accordingly connected with the bars 11 and 12 for pivotal movement relative thereto. Engaged by clip 29 is a cylindrical indicating member 31 comprising an open ended cylindrical shell 32 which as shown in Figures 1 and 3 is provided with cut out portions at opposite sides thereof defining a pair of broken arrows 33 and 34 in each opposite side thereof, arrow 33 pointing to the left and arrow 34 pointing to the right. Removably and loosely disposed within the shell 32 is a partition 35 which is retained in position centrally of the length of shell 32 by engagement therewith of the adjacent ends of removable cylindrical transparent members 36 whose opposite ends terminate flush with the opposite ends of shell 32.

Removably disposed between members 36 and shell 32 and coextensive with members 36 is a pair of cylindrical light screens 37 each of which is preferably formed by rolling a rectangular piece of suitable paper into cylindrical form and entering it into shell 32 with the corresponding member 36.

The screens 37 are adapted to provide any desired color of light and eliminate the otherwise brightness of the light.

The cylindrical members 36 may be so constructed as to diffuse the light and avoid the otherwise glare or brightness and may also be such as to provide any desired color of light in which event the screens 37 may be disposed with.

The ends of shell 32 are closed by means of removable caps 38, each of which is provided with a marginal flange 39 for engagement with the outer face of shell 32. Each cap 38 is centrally apertured for reception of a screw bolt 41 which extends through an aperture in a diametrically extending strip 42 disposed in engagement with the inner face of cap 38 and provided with a yieldable extension 43 adapted to rest between flange 39 and shell 32 to yieldably hold cap 38 in engagement with shell 32.

The bolt 41 further extends through a leg 44 of a light retaining bracket 45 and a pair of insulating washers 46 engage bolt 41 on opposite faces of cap 38 and leg 44. A suitable light 47 is detachably supported by each bracket 45 and a yieldable contact member 48 is supported by each bolt 41 in engagement with the inner insulating washer 46 adapted to engage the contact point 49 of light 47. Each bolt 41 is provided with nuts 51 adapted to be turned up against outer insulating washer 46 to securely bind strip 42, bracket 45, and contact member 48 in engagement with cap 38. It will be noted that broken arrows 33 and 34 provide considerable space between the heads and bodies thereof which prevents a glare from lights 47 to properly diffuse the light.

The bracket 10 is suitably supported from the upper transverse bar 52 of the wind-shield 53 or to the wooden top frame by means of suitable securing elements engaging the upper ends of bars 11 and 12 as shown in Figure 7, and the lights 47 are controlled by means of a snap switch 55 adapted to be detachably supported by the gear shift lever 56 as shown in Figure 7.

The switch 55 comprises a plug 57 provided with a centrally disposed threaded opening 58 adapted to be detachably engaged with a threaded end of gear-shift lever 56. Partially surrounding opening 58 and secured to plug 57 by means of screw 59 is a thin curved member 61 whose ends project outwardly from plug 57 defining yieldable contact members 62 and 63.

The plug 57 is provided with a circular groove 64 adjacent the upper end thereof in which is removably disposed a circular helical spring 65 secured to plug 57 at one point by a suitable screw 65'. Surrounding plug 57 is a cylindrical member 66 closed at the outer end thereof as indicated at 67 and provided with an externally threaded extension 68 adapted to removably support a suitable knob 69 similar to those in common use as indicated in Figure 7. The member 66 is tapped at 71 for receiving a screw 72 which extends between certain convolutions of helical spring 65 at a point opposite screw 65'.

Detachably carried by cylindrical member 66 are contacts 73 and 74 adapted for cooperation with contact members 62 and 63 respectively upon turning cylindrical member 66 relative to plug 57.

In mounting the switch 55 on gear-shift lever 56, it is necessary that plug 57 be tightly screwed into the extension of gear shift lever 56 and to provide for this a hole 75 is drilled through cylindrical member 66 and into plug 57 as shown in Figure 5 to receive a dowel pin to hold member 66 and plug 57 immovable relative to each other upon screwing plug 57 through member 66 onto the lever 56 after which the dowel pin is removed.

The signaling device is wired as indicated in Figure 8 wherein bracket 10 is connected to positive terminal of battery 76. The lights 47 are connected to corresponding contacts 73 and 74 of switch 55 which is grounded, as shown, thus completing the circuit through the lights 47 with the negative terminal of battery 76.

In operation, the signaling device together with the mirror 27 is supported within the wind-shield 53 by connecting the outer ends of bars 11 and 12 of bracket 10 to the cross-member 52 as indicated in Figure 7 or to the wooden top frame, thus positioning the indicating member 31 so that it is visible from the rear of the automobile in which it is mounted through the rear window, and also visible from the front of the automobile through the wind-shield.

The bracket 10 not only supports the mirror and indicating member within the wind-shield but it provides an adjustment for the mirror through the slots 20 and a two-way pivotal action through bolts 22 and 23 in member 21, and further provides an adjustable pivotal connection at 13 for the indicating member 31.

The signaling device supported as above stated, the switch 55 is secured to shift lever 56 and the signaling device and switch connected as above described and diagrammatically illustrated in Figure 8.

The driver of the automobile upon intention of making a turn to the left or to the right, turns the knob 69 in a corresponding direction to that in which he intends to turn causing member 66 to rotate about plug 57, bringing contacts 62 or 63 into engagement with contact 73 or 74 thus closing the circuit through either of the lights 47 which will illuminate the arrows at either end of shell 32 and on opposite sides thereof which will visibly represent the direction in which the driver intends to turn both from the rear and from the front of the automobile.

It is a common practice of many drivers to have their hands on the gear shift lever upon turning a corner in readiness for a change in gears which renders it desirable to mount the switch at this point which is easily operated by merely imparting a slight rotation to knob 69 in in a direction corresponding to that in which it is desired to turn. The spring 65 is secured to plug 57 at one point and engaged by screw 72 carried by member 66 at a diametrically opposite point automatically rotating member 66 back again and normally maintains contact members 62 and 63 and contacts 73 and 74 out of engagement or in neutral position. The successive contact of members 62, 63 and 73, 74 respectively and the automatic disengagement thereof causes a flashing to attract attention both from the front and rear of the automobile.

The indicating member 31 as clearly shown in Figure 3 consists of relatively few simple parts and is easily and quickly assembled and disassembled.

In Figures 9 and 10 is disclosed a modified means for holding the end caps in position wherein shell 32 at each end thereof is provided with a pair of diametrically opposite outwardly punched lips 32' adapted to yieldably engage the inwardly converging flanges 39' of end caps 38 to hold the caps in position.

Certain makes of automobiles are provided with rear windows which are comparatively small and of such design that the visibility of the indicating member 31 suspended from the windshield would be somewhat restricted from the rear, in which cases an additional similar indicating member may be attached inside the rear window at the top and center thereof.

When employing an additional indicating member, one set of arrows in each member will be blocked off preferably by inserting a tube within the shell 32 of each indicating member 31 having one side opaque and the other side transparent or translucent, the opaque side blocking off one set of arrows such that right and left arrows will be visible in front from the indicating member suspended from the wind-shield, and right and left arrows will be visible in the rear from the indicating member attached to the rear window. It will of course be understood that both indicating members will be simultaneously operated by the switch 55.

While I have disclosed a single embodiment of my invention it is to be understood that I am not limited thereto but am at liberty to make such changes or alterations as fairly fall within the scope of the sub-joined claims. Accordingly what I claim as new and desire to secure by United States Letters Patent is:

1. A direction signaling device for automobiles, said device comprising a direction indicating member; a bracket having means adapting it for support adjacent the top of the windshield of the automobile; a rear view mirror; said bracket being provided with means to adjustably support said rear view mirror, and with other means to support said direction indicating member in proximity to said mirror so that both said member and said mirror are visible from the driver's seat of the automobile.

2. In a direction signaling device: a bracket; a plate, and means for detachably securing said plate to said bracket; a second plate, and means pivotally and adjustably mounting the same on said first plate; a mirror; and means for detachably mounting said mirror on said second plate; and a direction indicating member supported by said bracket in vertically offset relation to said mirror.

3. In a direction signaling device; a bracket comprising a pair of bars arranged in V-shape, adjacent ends of which are overlapped and apertured; a plate, and means detachably connecting said plate to the separated portions of said bars; a mirror, and means for supporting said mirror from said plate; a clip provided with apertured ears; a member extending through said overlapped apertured bar ends and said apertured ears to connect said clip to said bars; and a direction indicating member supported by said clip in downwardly offset relation to said mirror.

4. A direction signaling device for automobiles, said device comprising a bracket structure designed for support above the windshield of said automobile; said bracket including means for rendering it detachably adjustable, and means for pivotally supporting a rear view mirror; a direction indicating member disposed in a position to be visible through said windshield and through the rear window of said automobile; and means for mounting said indicating member on said bracket structure.

5. Direction signaling means for automobiles comprising a signaling device provided with means to indicate direction as viewed from the front or rear thereof; and means for supporting said device in front of the driver of an automobile in such position that it is in the normal view of the driver and visible from the front and rear of the automobile through the windshield and rear window of the automobile respectively.

6. For use on a vehicle having a windshield, and a rear view mirror mounted adjacent the top of said windshield: a signaling device provided with direction indicating means that is visible from two opposite directions; and means for supporting said device adjacent said mirror in such position that said indicating means is visible from both the front and rear, without obstruction from the mirror.

7. A direction signaling system comprising in combination with a shiftable automobile transmission lever having a substantially straight portion within convenient reach of the operator: a direction signal; and a manually operable mechanism connected with said signal to actuate the latter; said mechanism embodying a member carried by said lever and disposed for convenient actuation, said member having neutral and signaling positions and being oscillatable to and from said positions about an axis which is approximately parallel with the axis of said substantially straight portion of the lever, and means for resisting movement of said member away from its neutral position.

8. A direction signaling system comprising, in combination with the upper portion of a gear shift lever of a vehicle; a direction signal; and a manually operable mechanism connected with said signal to actuate the latter; said mechanism embodying a member carried by said lever and disposed for convenient actuation adjacent said upper portion; said member being shiftable on said lever about an axis contained approximately in a vertical plane passing longitudinally of the vehicle, and having a neutral position and a signaling position, and means yieldingly holding said member in its neutral position.

SEWARD M. ROBERTS.